United States Patent
Kanevsky et al.

(10) Patent No.: US 6,587,128 B2
(45) Date of Patent: Jul. 1, 2003

(54) METHOD FOR DISPLAYING HIDDEN OBJECTS BY VARYING THE TRANSPARENCY OF OVERLAPPING OBJECTS

(75) Inventors: Dimitri Kanevsky, Ossining, NY (US); Alexander Zlatsin, Yorktown Heights, NY (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/096,041

(22) Filed: Mar. 12, 2002

(65) Prior Publication Data

US 2002/0089546 A1 Jul. 11, 2002

Related U.S. Application Data

(62) Division of application No. 09/354,188, filed on Jul. 15, 1999, now abandoned.

(51) Int. Cl.[7] .................................................. G06F 3/14
(52) U.S. Cl. ....................................... 345/768; 345/800
(58) Field of Search ................................ 345/700, 701, 345/744–747, 764, 766, 768, 781, 782, 788–790, 794, 798–801, 835, 836, 848, 849, 852, 619, 620, 625, 660, 672

(56) References Cited

U.S. PATENT DOCUMENTS

| | | | |
|---|---|---|---|
| 4,829,470 A | | 5/1989 | Wang .......................... 707/521 |
| 5,001,697 A | | 3/1991 | Torres ......................... 707/542 |
| 5,227,771 A | | 7/1993 | Kerr et al. ................... 345/800 |
| 5,283,560 A | * | 2/1994 | Bartlett ........................ 345/729 |
| 5,463,728 A | * | 10/1995 | Blahut et al. ............... 345/629 |
| 5,546,520 A | | 8/1996 | Cline et al. .................. 345/800 |
| 5,651,107 A | * | 7/1997 | Frank et al. ................. 345/589 |
| 5,771,032 A | | 6/1998 | Cline et al. .................. 345/786 |
| 5,805,163 A | * | 9/1998 | Bagnas ........................ 345/768 |
| 5,825,308 A | * | 10/1998 | Rosenberg .................... 341/20 |
| 6,072,489 A | * | 6/2000 | Gough et al. ............... 345/803 |
| 6,429,883 B1 | * | 8/2002 | Plow et al. .................. 345/768 |

* cited by examiner

Primary Examiner—Crescelle N. dela Torre
(74) Attorney, Agent, or Firm—Scully, Scott, Murphy & Presser; Daniel P. Morris, Esq.

(57) ABSTRACT

The dynamically sized window automatically adjusts its right border if the text on the line exceeds beyond the window size, thereby eliminating a need for a manual adjustment of the window size and/or scrolling through the window. Moreover, the present invention enables a capability to increase only the selective parts of the window that displays a longer line. Similarly, adjustments to the window are enabled for those windows having graphical pictures whose size exceeds the window size. Windows overlapping other windows may be made transparent so that the underlying window is visible.

32 Claims, 6 Drawing Sheets

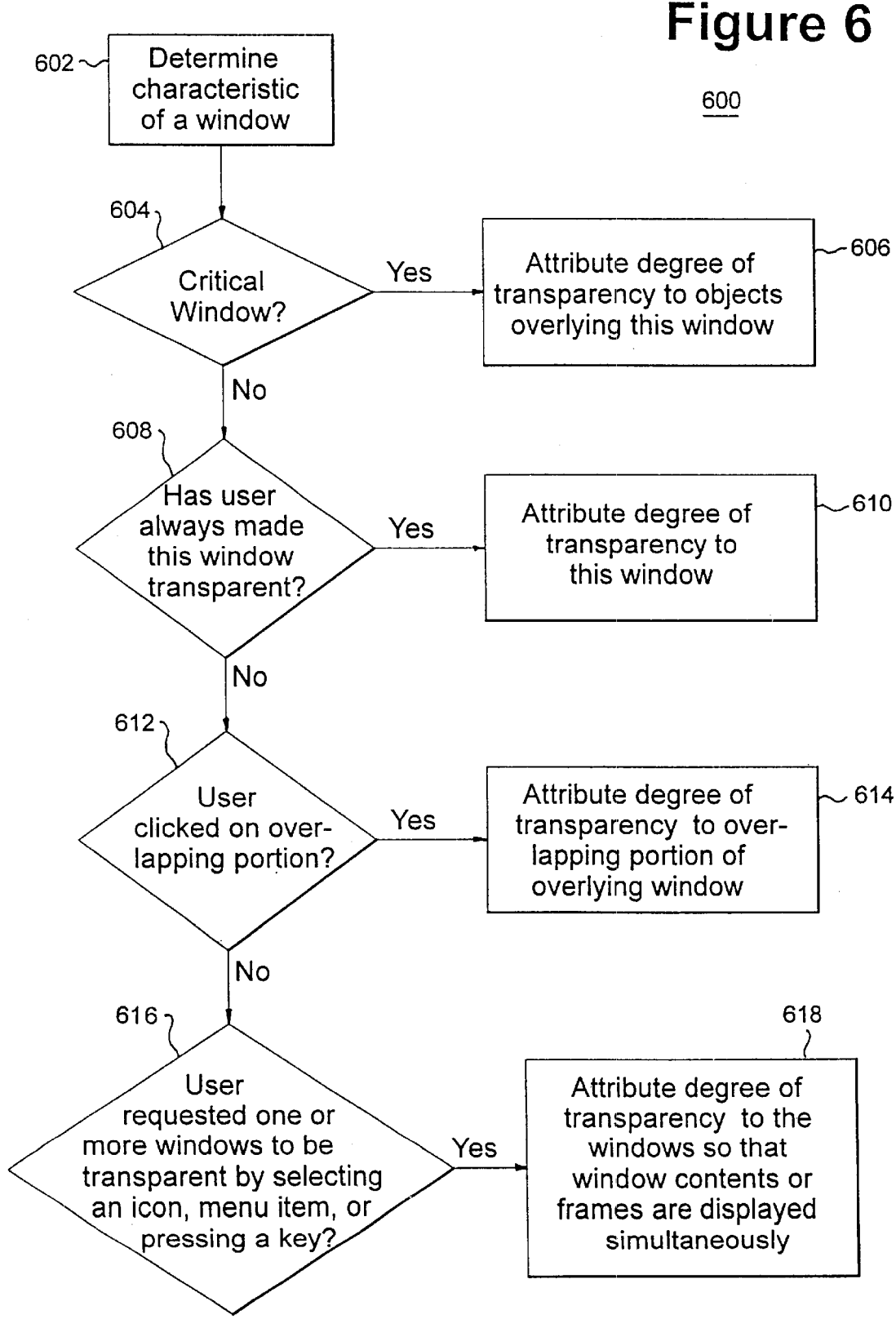

METHOD FOR DISPLAYING HIDDEN OBJECTS BY VARYING THE TRANSPARENCY OF OVERLAPPING OBJECTS

RELATED APPLICATIONS

This application is a divisional of U.S. application Ser. No. 09/354,188, filed Jul. 15, 1999, now abandoned.

TECHNICAL FIELD OF THE INVENTION

The present invention generally relates to computer graphical user interfaces (GUIs) and more particularly, to a system for automatically adjusting graphical user interface windows and objects for computers according to the size and content of the object presented.

BACKGROUND OF THE INVENTION

Presently, graphical user interface (GUI) windows and icons displayed on conventional computer systems have a fixed rectangular shape of a predetermined size. The current GUI technology enables users to manually resize the window by minimizing, maximizing, and dragging the corners of the rectangular window to a desired size. For example, if the window size is larger than the content displayed on it, the window would contain a blank area which need not be viewed. In such instances, a user typically minimizes the window to a size needed to display the content, leaving the background area in the screen space for other use. In other cases where the content of the window, such as texts and graphic pictures, need larger display area than the predetermined window size, a user is required to scroll through the window and/or manually resize the window by maximizing or dragging the corners of the rectangular window to a desired size to be able to view the rest of the content contained in the window. For example, in "unflowed text" typically found in documents edited with text editors such as emacs or vi, when lines of text extend past the right edge of a window displaying the text, the user manually scrolls to the right using a scroll bar to view the rest of the line of the text, scrolling back to the left to re-view the left portion of the text line. The manual scrolling becomes a burdensome task, especially when the user needs to navigate back and forth between left and right sides of the windows in order to view the content. Moreover, although maximizing a window may reduce the problem associated with manual scrolling, maximization typically results in overlapping and covering up the rest of the screen space, and thereby obscuring the view to other displayed items or objects on the screen space. Therefore, it is highly desirable to provide a capability in GUI to dynamically and automatically resize the window according to the content displayed in it, and to eliminate or reduce a need for manually adjusting the window sizes, thereby reducing the burden on a user.

Moreover, the manual resizing in conventional GUI windows produces the same four-sided rectangular shape regardless of the content displayed. For example, the text contained inside a window may only have few lines exceeding the length of the window. Although only the portion of the window having those lines need to be resized, the conventional window resizing technique resizes the whole window, i.e., increases one or more sides of the windows to view those few lines. Such increase in the size of the window may result in overlapping of other windows on the screen space, and thereby obscure the views of the affected underlying windows. Therefore, it is also highly desirable to provide a capability to resize the windows automatically and dynamically based on the shape and the size of the displayed objects.

A graphical user interface (GUI) for computer systems typically include a capability to present on a screen space a plurality of windows each of which may have a different application running under it, providing a user with the appearance of the multitasking capabilities. More often than not, during a typical user session in a given computer system, a user is likely to take the advantage of such a capability to access more than one application by opening separate windows for each application. However, when a plurality of windows are displayed on a limited display space, i.e., a screen space limited by the physical size of a display monitor or terminal, it becomes difficult to view all the windows at once. Inevitably, some items or windows become obscured by the overlapping windows or objects. Moreover, the multiple window displays are presented in a disarray, requiring considerable time and effort by users to search for desired windows or other objects such as icons which are visually obscured by other windows. Frequently, users do not even realize that they have various active windows on their screen and available for their use. Therefore, it is highly desirable to provide a capability for users to easily view and recognize what windows are currently open on the screen space without having to navigate through each and every open window.

SUMMARY OF THE INVENTION

The present invention provides GUI capabilities to automatically and dynamically size and reshape windows on a computer display terminal. The automatic sizing criteria may be based on the content displayed in the window. For example, in a window displaying a text, each line of the window is automatically adjusted at the right borders according to the amount of text on a line. Similarly, displayed objects such as graphic pictures are displayed according to the outlines or boundaries of the pictures instead of being displayed in rectangular frames. Thus, the present invention provides capability to dynamically size display items, not limited to text lines, including icons and animated images. Similar adjustment are be made to the window that includes pictures having different sizes from the window size.

The dynamic reshaping of a window in the present invention may be embodied in any direction. For example, the window may be resized at the top, bottom, left, and right, according to the geometric shape of an item or the content of the item being displayed.

Furthermore, the present invention provides a capability to set a default minimum and maximum size of a dynamically adjustable window such that a particular line will not become smaller or larger than a preset thresholds. Moreover, the thresholds may be determined by the user, for example, by including in a user profile stored on storage media. Alternatively, they may be determined automatically by a computer system based on various criteria including: 1) mathematical relationship based on a user's past thresholds, for example, if the user has on the average set a minimum length of 4 inches, the system sets this minimum length as default; 2) parameters specified in the document being displayed in that window.

An advantage with the dynamic reshaping of the present invention is that no manual adjustment of the windows are necessary to view the total content. Moreover, because only necessary portions of the window are reshaped or resized, the rest of the screen space is less likely to be obscured from the user's view as is normally done in conventional rectangular windows.

The aforementioned concepts also apply to 3-D environments in which information is presented in a 3-D form. For example, in a virtual reality environment, a 3-D window may conform to the contents of the window as described herein.

Additionally, the present invention provides a GUI which enables windows to become transparent such that other underlying windows may be viewed without having to close or resize the top windows. With transparent overlying windows, a user can locate and select background windows which would normally be obscured from view by foreground windows.

The transparent windowing capabilities of the present invention are provided by having the foreground windows become transparent and allowing obscured windows to produce "ghosts" through the foreground window. The present invention enables the background window to be seen and selected with a selection device such as a mouse-driven cursor. The transparent windowing provided by the present invention enables an underlying window to be selected, by bringing it to the foreground by pointing at the obscured window's title bar. Alternatively, the underlying window need not be brought to the foreground in order to be selected. The present invention allows an option to select the windows to be in a transparency mode. Option to have transparent windows may be set by selecting an appropriate icon, pressing a key, or waiting for a predetermined amount of time to lapse. Selecting such an option, therefore, would return the windows and objects to a normal state.

Further features and advantages of the present invention as well as the structure and operation of various embodiments of the present invention are described in detail below with reference to the accompanying drawings. In the drawings, like reference numbers indicate identical or functionally similar elements.

BRIEF DESCRIPTION OF THE DRAWINGS

Preferred embodiments of the present invention will now be described, by way of example only, with reference to the accompanying drawings in which:

FIG. 6 is a flow diagram illustrating an example of a process determining which windows are to be given a transparency attribute in accordance with the present invention.

DETAILED DESCRIPTION OF THE PREFERRED EMBODIMENT OF THE INVENTION

The present invention provides a GUI window which is dynamically and automatically sized based on the size and shape of the contents displayed in the window. Furthermore, the present invention enables windows to be displayed in a transparent mode such that one or more hidden windows may be viewed without having to close those foreground windows on the top.

Figure 1:
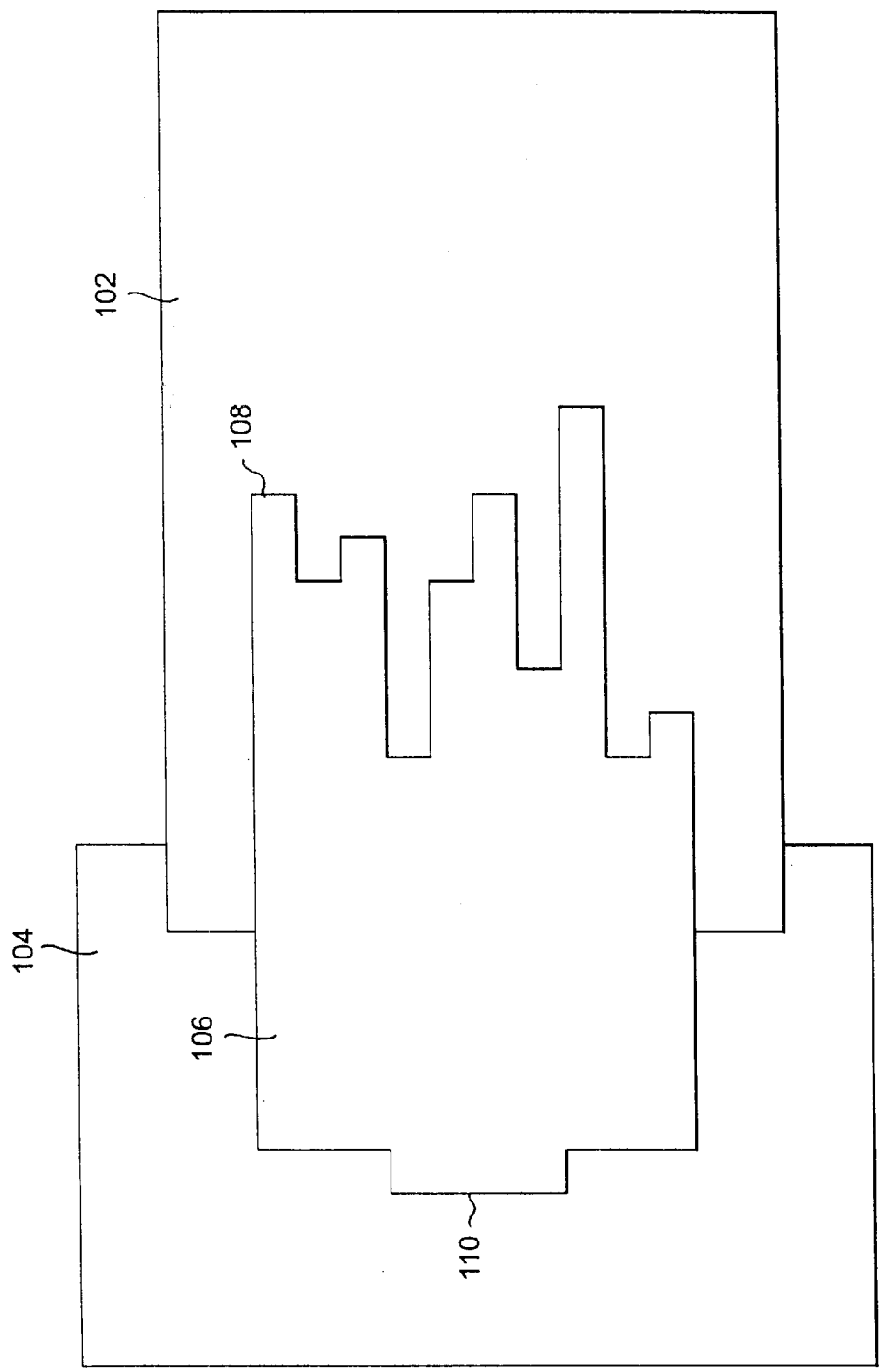
FIG. 1 illustrates a plurality of windows overlapping one another including a display window of the present invention resized and reshaped based on the text content displayed in that window.

FIG. 1 illustrates a plurality of windows overlapping one another including a display window of the present invention resized and reshaped based on the text content displayed in that window. The reshaping mechanism of the present invention may be integrated within an operating system such as MS Windows or operate as a separate program communicating with an operating system to achieve its functions. Moreover, the resizing and reshaping of windows in the present invention is not limited to texts displayed, but also can apply to graphics pictures and icons. In FIG. 1, two windows 102, 104 are displayed in the background with an example foreground window 106 depicted as overlapping the two background windows 102, 104. The foreground window 106 includes the borders 108, 110 that are resized and reshaped according to the principles of the present invention. That is, the right boundary 108 follows the length of each line in a text displayed in the window. Similarly, the left boundary 110 may be resized or reshaped to include a part of a text displayed in the window. Advantageously, with the resized or reshaped windows of the present invention, the contents of a window are less likely to be outside the window and therefore, document viewing is convenient. Moreover, the background windows 102, 104 are less likely to be obscured by the foreground window 106.

Figure 2:
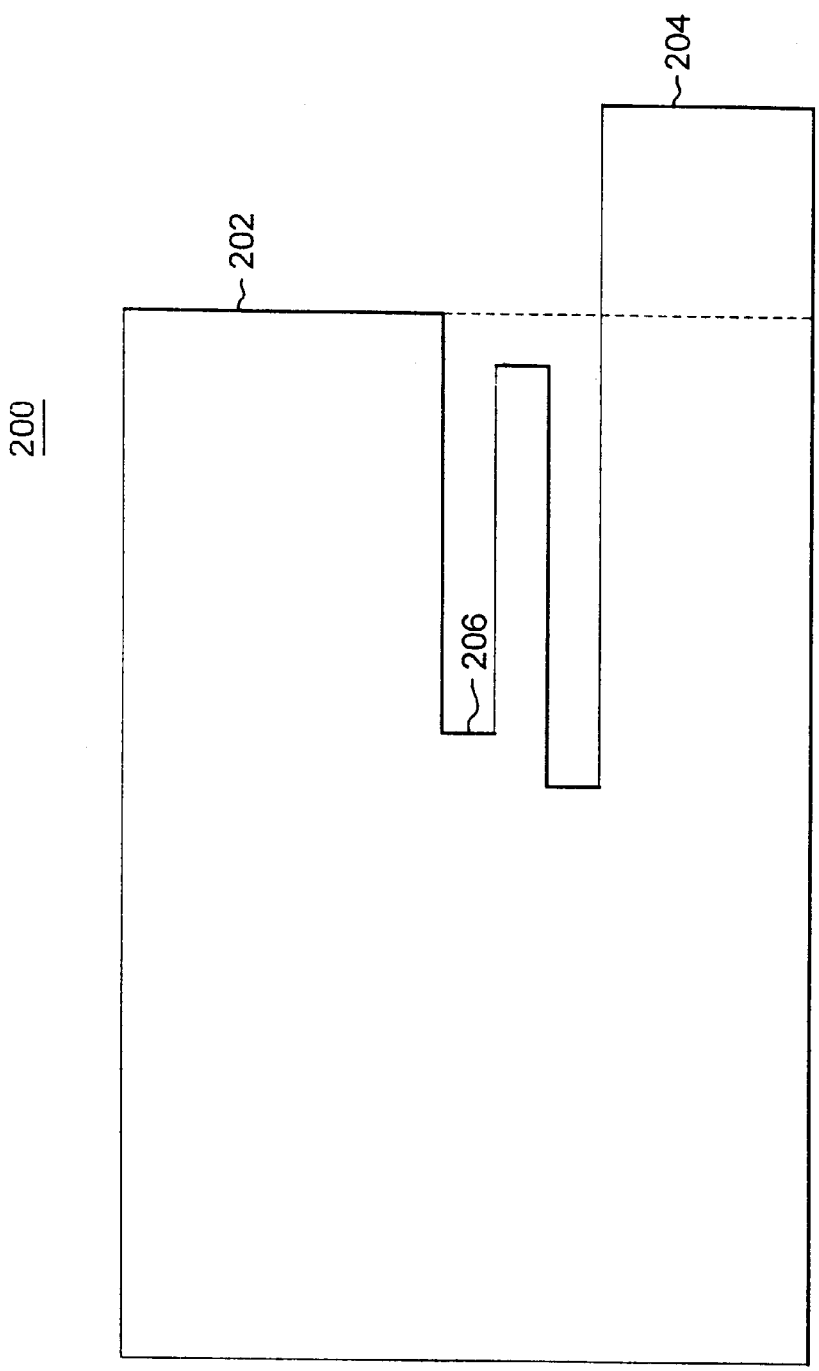
FIG. 2 illustrates a display window of the present invention resized and reshaped according to the line length of the text lines displayed in the window.

FIG. 2 illustrates a display window of the present invention resized and reshaped according to the line length of the text lines displayed in the window. The window 200 shown in FIG. 2 has text content which includes both "unflowed" text and "inflow" text. Unflowed text generally refers to lines of text which extend beyond the length of the displayed window, and thus are hidden and not viewable in the window unless the window is scrolled and contents are repositioned as accomplished in the prior art. These types of unflowed text are seen typically in text editor applications such as "emacs" or "vi". Inflow text refers to lines of text which extend beyond the length of the displayed window, but an application which displays the text automatically wraps the text around the next line, such that the window need not be scrolled to view the rest of the line. The dynamic window adjusting method of the present invention adjusts the screens for both instances. For example, for unflowed text, the window length containing the unflowed text is increased to fit the line; the length of the window which has the wrap around portion of the inflow text is adjusted to fit that line. In FIG. 2, the window 200 having a conventional right boundary 202 is adjusted to fit lines of longer length 204, for example an unflowed text, as well as those having a shorter length 206.

A user may set a minimum and maximum window length if desired, so that a particular line will not become smaller or larger than a predetermined threshold. A threshold may be determined by the user, for example in a profile stored in a storage device such as a disk, or the threshold may also be determined by the system based on a criteria. Such criteria may include a mathematical relationship based on a user's past thresholds. For example, if the particular user has in the past had a minimum length of 4 inches as average minimum length, the system sets this minimum length as the default. Alternatively, the parameters may be specified in the document that is displayed.

Figure 4:
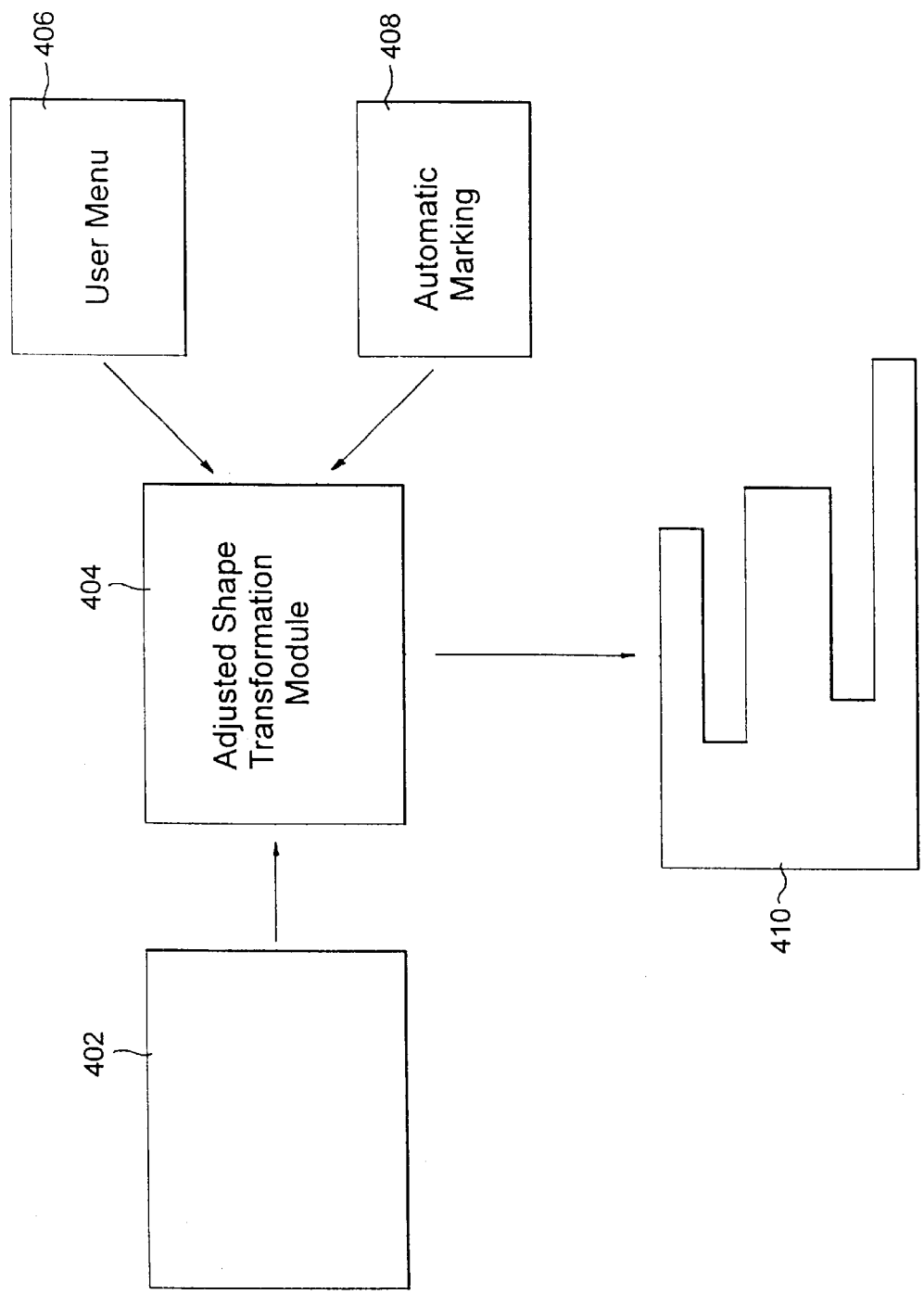
FIG. 4 illustrates a process by which a conventional rectangular shaped window is reshaped and resized in accordance with the present invention.

FIG. 4 illustrates components which are used to reshape and resize a conventional rectangular shaped window in accordance with the present invention. Before a window 402 having a conventional rectangular shape is displayed, an adjusted shape transformation module 404 of the present invention receives display parameters related to that window 402. The transformation module then determines how each window should be adjusted. For example, if it is determined that a user desires to set the size of the window, a user menu 406 will be displayed requesting the length and length parameters of the window. Alternatively, the module 404 may automatically set the length of each line to be displayed based on the actual line length of the text by marking end of each text line as shown at 408. Additionally, the transformation module 404 may automatically set the size of the borders of the window based on a predetermined set of parameters stored in a storage device accessible to the transformation module 404. After having determined the size of the borders of a window by either receiving a user input from the user menu 406, or by automatically marking 408 the border size based on its own determination or a parameter lookup, the transformation module 404 proceeds with adjusting the borders using a conventional technique of displaying windows known to those persons skilled in the technological art.

Figure 5:
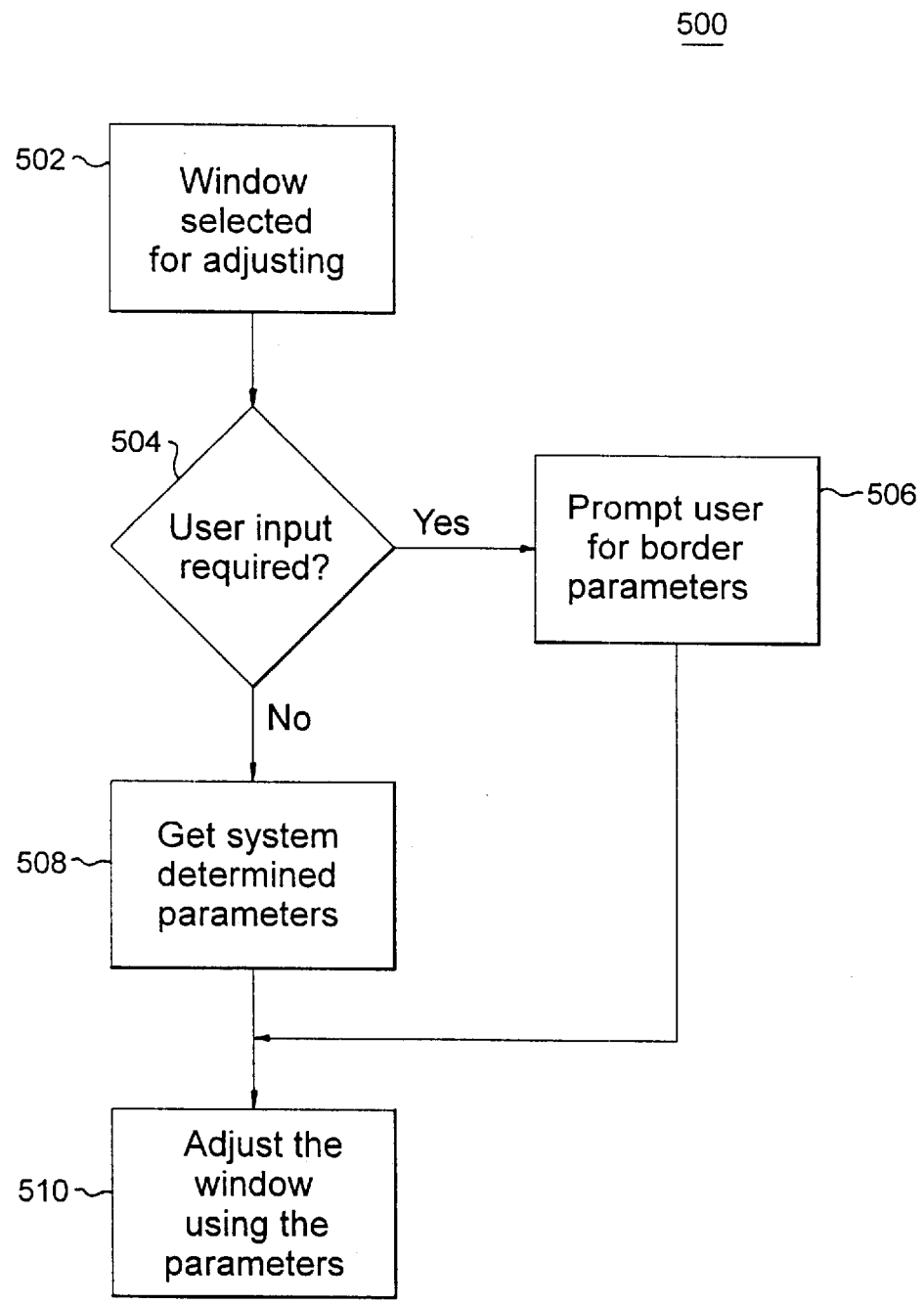
FIG. 5 illustrates a flow diagram for reshaping graphical user interface windows in accordance with the present invention.

FIG. 5 is a flow diagram illustrating the reshaping process according to one embodiment of the present invention. At step 502, a window is selected for reshaping. At step 504, if a manual user input is required to set border parameters, user is prompted to enter the border settings for the window at step 506. Otherwise, at step 508 the system automatically determines the border parameters from the user's past behavior or by retrieving the parameters from a prestored profile file having user preferences. At step 510, the window borders are adjusted and reshaped.

The resizing and reshaping of windows in the present invention is not limited to texts displayed, but also can apply to graphics pictures and icons. Similar adjustment can be made to the window that contains a picture that extends beyond the window.

In addition, the present invention provides a transparent window option whereby foreground windows become transparent allowing obscured windows to produce "ghosts" through the foreground window, allowing the background window to be seen and selected with a selection device such as a mouse-driven cursor. For example, an underlying window may be selected, by bringing it to the foreground by pointing at the obscured menu's title bar. Alternatively, the underlying window need not be brought to the foreground in order to be selected.

Figure 3:
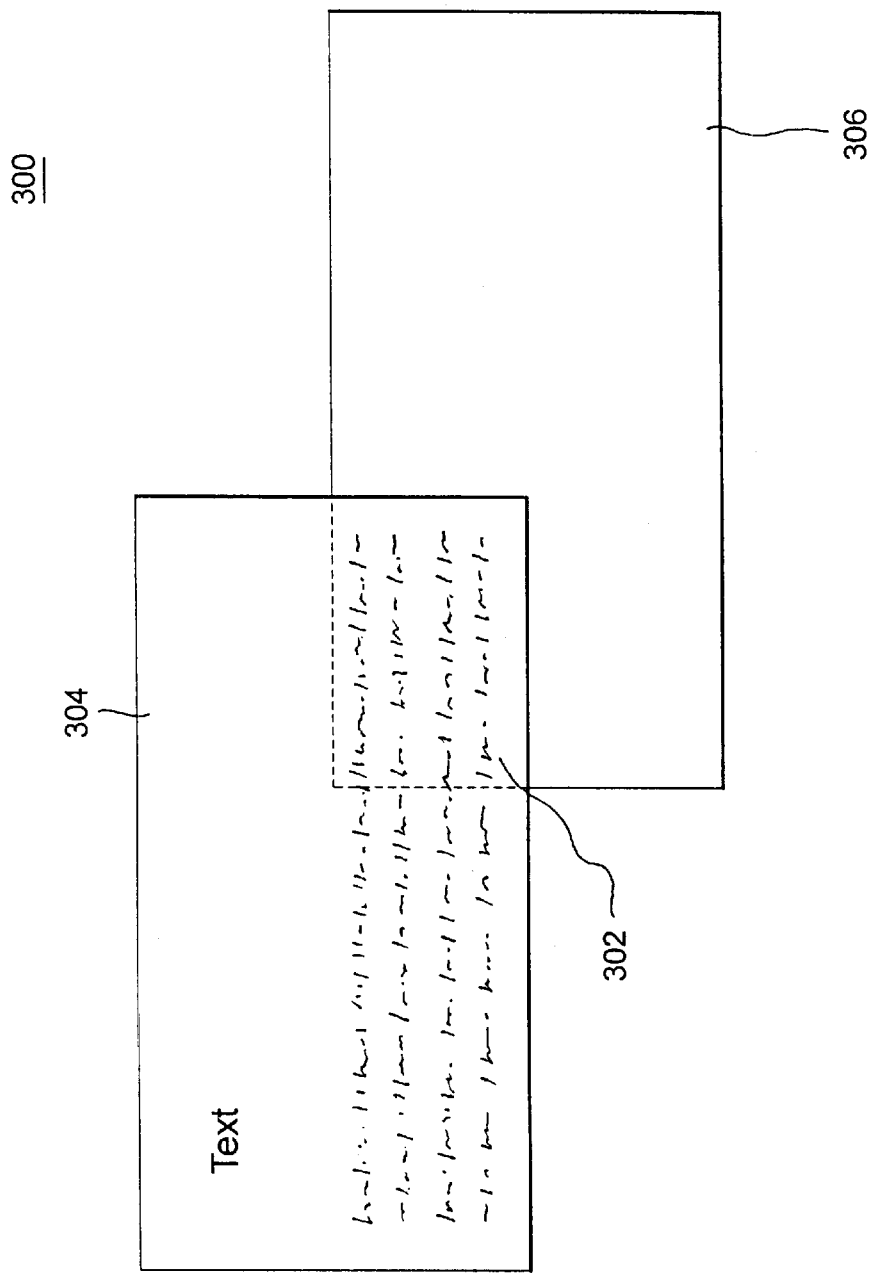
FIG. 3 illustrates two windows partially overlapping each other and having a transparent portion.

FIG. 3 illustrates two windows partially overlapping each other and having a transparent portion. As shown the first window 304 and the second window 306 overlap at 302. According to the present invention, this portion 302 of the window may be display in a transparent mode such that the contents of both windows may be seen at the same time. Alternatively, the contents or window frame for the first window or second window may be displayed.

The system may determine whether a user is selecting the overlying window or if he is selecting the underlying window through the transparent overlying window. For example, once the transparency option is enabled, any user selection in a region 302 that contains two windows refers to the underlying window. Mouse buttons, or keyboard buttons may also be used to specify which of two or more windows are to be selected. When more than two windows overlap in a certain region of the screen, the user may cycle through each window and make a selection. For example, the user may use a mouse button to activate window one 304, window two 306, window three (not shown), etc., with such activation being made known to the user through a graphical highlighting. That is, the window or window border corresponding to the activated window may be visually distinguished by brightening, color change, blinking, font change, size, and/or shape.

The transparency option can be turned on and off as desired by selecting, for example, a transparent window icon, pressing combination of control function keys and alphanumeric keys on the keyboard, or entering a specific sequence of mouse key presses. The option may automatically turn off under system control or when the user has finished a particular act such as selecting an underlying window.

Additionally, the window transparency may be automatically controlled by the system's determination of a user need based on the user's past behavior or by parameters stored on disk. For example, if the user has always in the past made a window transparent when there are N hidden windows, icons, or other graphical elements, the system may make the overlying windows transparent. The number N>0 may be determined by the system automatically or set by the user and stored in a file on disk.

Moreover, an application program or the operating system may determine which windows are to be transparent. For example, an important information or warning message may be obscured from the user's view by overlying windows, and the operating system or application program may make these overlying windows transparent so that a user can see the information or warning message. Once the message is read and the system becomes aware of it by example, detecting when a user clicks "OK", normal GUI viewing returns. The system may also generally determine an importance of material and make this material visible to the user by making overlying graphical material transparent.

The degree of transparency may be determined by a number of criteria such as the importance of the underlying material. For example, if the material is crucial and must be seen immediately, the overlying windows may become completely transparent. If the underlying material is less important, the overlying material may have only partial transparency.

FIG. 6 is a flow diagram illustrating a process of the present invention which determines when to attribute transparency to a window. At step 602, a characteristic of a window is determined. For example, a window may be a notification window which must be viewed by a user. At step 604, the window is then determined to be a critical window, and at step 606, other objects overlying the window are given transparency attributes such that the window can be viewed through these objects. At step 608, if a user has always made this window transparent, then the window is given a transparency attributes so that other underlying objects may be view through it. Additionally, a user may click on an overlapping portion of two or more windows or objects as shown at step 612 to make the underlying objects appear gradually over the overlying objects at step 614. Such effect may be achieved by attributing degrees of transparency to each overlapping windows. Moreover, in some instances a user may desire to see what windows are currently displayed on a screen, or search for a particular window desired among other windows on a screen. The present invention enables the user to manually make a request to turn on the transparency mode for some or all windows on a screen. As shown at step 616, the user may make the request, for example, by selecting an icon, menu item, or pressing a key. At step 618, the system of the present invention responds to the user request by, for example, displaying all the window frames or borders simultaneously, including those windows which are normally obscured by overlying windows.

Transparency may take many forms, but in general it refers to the viewing of material normally hidden by overlying opaque windows. The transition from opaque to some degree of transparency may be gradual over the course of several seconds. When an overlying window becomes transparent or translucent, various elements of the overlying window may still be visible, for example, the title bar, the borders of a frame, scroll bar, may still be visible. Additionally, the underlying windows that become visible because the overlying windows are transparent may be seen in their entirety or they may display only certain elements such as their title bar, scroll bar, and/or frame. Even if only certain elements are displayed, refocusing of the underlying window, resizing, and iconifying the window may still be performed through the foreground window.

A visual simulation of transparency in the present invention may be achieved in a number of ways known to those skilled in the art. For example, all pixel values for overlapping window could be summed modulo 255. Thus when windows overlap, there would be a color change when pixel values are summed in the scroll, title bar, border, and other areas. Where there is no overlap of windows, there is no apparent visual change in the resultant display.

Other methods to achieve a simple pseudo-transparency include XORing of the pixel values for an entire window and border with all other overlapping windows and boarders. Other logical (bit) operations can be performed on overlapping pixel values to distinguish hidden windows or icons.

The aforementioned concepts also apply to 3-D environments in which information is presented in a 3-D form. For example, in a virtual reality environment, 3-D windows may become transparent to reveal interior structures, with all the features describe above. In virtual reality environments, the visual notion of transparency may be replaced by other sensory feedback. For example, various tactile features of a window may change to reveal underlying structures. Tactile features include: malleability, temperature, squishiness, texture, etc. When the sense of touch is being used, for example, with data gloves and other force-feedback devices known to those skilled in the art, an underlying object may be felt and selected through an overlying object. For instance, a user may feel what is inside a 3-D drawing of a box. The box in such an example corresponds to the overlying window and the object inside corresponds to the underlying window.

While the invention has been particularly shown and described with respect to a preferred embodiment thereof, it will be understood by those skilled in the art that the foregoing and other changes in form and details may be made therein without departing from the spirit and scope of the invention.

Having thus described our invention, what we claim as new, and desire to secure by Letters Patent is:

1. A method for enabling a view of one or more objects hidden by one or more overlapping objects on a display terminal, the method comprising:
   determining an object overlying a selected hidden object; and
   graphically attributing a degree of transparency to the overlying object such that the selected hidden object can be viewed trough the overlying object having the degree of transparency, said attributing being performed automatically based on a predetermined criteria associated with the selected hidden object, said criteria computed based on statistical data of a user's past behavior.

2. The method for enabling a view of one or more objects hidden by one or more overlapping objects as claimed in claim 1, wherein said overlying object includes a GUI window.

3. The method for enabling a view of one or more objects hidden by one or more overlapping objects as claimed in claim 1, wherein said selected hidden object includes a GUI window.

4. The method for enabling a view of one or more objects hidden by one or more overlapping objects as claimed in claim 1, wherein said overlying object includes a GUI icon.

5. The method for enabling a view of one or more objects hidden by one or more overlapping objects as claimed in claim 1, wherein said selected hidden object includes a GUI icon.

6. The method for enabling a view of one or more objects hidden by one or more overlapping objects as claimed in claim 1, wherein the step of attributing further includes:
   changing one or more pixel color values of said overlying object.

7. The method for enabling a view of one or more objects hidden by one or more overlapping objects as claimed in claim 1, wherein the step of attributing includes:
   graphically attributing a degree of transparency to portions of said overlying object.

8. The method for enabling a view of one or more objects hidden by one or more overlapping objects as claimed in claim 7, wherein the portion includes a portion where the selected hidden object overlaps the overlying object.

9. The method for enabling a view of one or more objects hidden by one or more overlapping objects as claimed in claim 7, wherein the portion includes a portion overlapping borders of the selected hidden object, such that the borders of the selected hidden object can be viewed through the overlying object.

10. The method for enabling a view of one or more objects hidden by one or more overlapping objects as claimed in claim 1, wherein the step of attributing further comprises:
    changing pixel color values of said overlying object and said selected hidden object such that each object has a different translucent color attribute.

11. The method for enabling a view of one or more objects hidden by one or more overlapping objects as claimed in claim 1, wherein the predetermined criteria includes a degree of importance assigned to the selected hidden object.

12. The method for enabling a view of one or more objects hidden by one or more overlapping objects as claimed in claim 1, wherein the steps of determining and attributing are performed when a user manually requests to view said selected hidden object.

13. The method for enabling a view of one or more objects hidden by one or more overlapping objects as claimed in claim 1, wherein said overlying and hidden objects are displayed in a 3-dimensional form, the method further including accepting a user input via a force-feedback device for determining the selected hidden object.

14. The method for enabling a view of one or more objects hidden by one or more overlapping objects as claimed in claim 1, further comprising the step of dynamically adjusting a window shape on a computer screen, said adjusting step comprising:

determining a boundary of content displayed on a graphical user interface window; and adjusting a graphical border of the graphical user interface window to fit the boundary of content displayed in the graphical user interface window.

15. The method for enabling a view of one or more objects hidden by one or more overlapping objects as claimed in claim 14, the method further comprising the step of displaying the graphical user interface window having the adjusted border.

16. The method for enabling a view of one or more objects hidden by one or more overlapping objects as claimed in claim 14, the method further comprising the step of reshaping the graphical user interface window by readjusting portions of window that no longer have contents displayed.

17. The method for enabling a view of one or more object hidden by one or more overlapping objects as claimed in claim 14, the method further comprising the steps of determining length of each line of text displayed in the graphical user interface window; and adjusting length of the window to fit said each line.

18. The method for enabling a view of one or more objects hidden by one or more overlapping objects as claimed in claim 14, wherein the adjusted graphical border includes ragged edges in accordance with the boundary of content.

19. The method for enabling a view of one or more objects hidden by one or more overlapping objects as claimed in claim 14, method further comprising:

selecting a graphical user interface window for adjusting according to a predetermined criteria before the step of determining.

20. The method for enabling a view of one or more objects hidden by one or more overlapping objects as claimed in claim 19, wherein the predetermined criteria includes user specified criteria.

21. The method for enabling a view of one or more objects hidden by one or more overlapping objects as claimed in claim 19, wherein the predetermined criteria includes system automated criteria computed based on statistical data of user's past behavior.

22. The method for enabling a view of one or more objects hidden by one or more overlapping objects as claimed in claim 19, wherein the predetermined criteria includes criteria specified in a document displayed in a window whose shape is being adjusted.

23. The method for dynamically adjusting a window shape on a computer screen as claimed in claim 14, wherein the step of determining a boundary of content includes accepting user input which specifies the boundary parameters.

24. The method for dynamically adjusting a window shape on a computer screen as claimed in claim 14, wherein the step of determining a boundary of content includes setting the border to values specified in a document displayed in a window whose shape is being adjusted.

25. The method for dynamically adjusting a window shape on a computer screen as claimed in claim 14, wherein the step of determining a boundary of content includes setting the border to a system evaluated value which is based on statistical data of past behavior.

26. The method for dynamically adjusting a window shape on a computer screen as claimed in claim 14, wherein the step of determining a boundary of content further includes retrieving threshold values which represent maximum and minimum size of a window; and the step of adjusting further includes adjusting the border to be within the threshold values.

27. The method for dynamically adjusting a window shape on a computer screen as claimed in claim 14, wherein the step of adjusting further comprises:

adjusting a border of the graphical user interface window to a size based on one of the boundary of content displayed and a predetermined boundary setting.

28. The method for dynamically adjusting a window shape on a computer screen as claimed in claim 14, wherein the step of determining includes:

determining a boundary of a pictorial image displayed on a graphical user interface window.

29. The method for dynamically adjusting a window shape on a computer screen as claimed in claim 28, wherein the pictorial image includes an icon.

30. A program storage device readable by machine, tangibly embodying a program of instructions executable by the machine to perform method steps for enabling a view of one or more objects hidden by one or more overlapping objects, the method steps comprising:

determining an object overlying a selected hidden object; and graphically attributing a degree of transparency to the overlying object such that the selected hidden object can be viewed through the object having the degree of transparency, said attributing being performed automatically based on a predetermined criteria associated with the selected hidden object, said criteria computed based on statistical data of a user's past behavior.

31. The program storage device as claimed in claim 30, wherein said overlying object includes a GUI window.

32. The program storage device as claimed in claim 30, wherein said selected hidden object includes a GUI window.

* * * * *